United States Patent [19]

Köster

[11] Patent Number: 4,631,643
[45] Date of Patent: Dec. 23, 1986

[54] DEMOUNTABLE MULTI-PURPOSE LIGHT TABLE

[76] Inventor: Detlef Köster, c/o Progressive Design Service, 137 Bayswater Rd., Rushcutters Bay, Sydney, 2011, New South Wales, Australia

[21] Appl. No.: 784,208
[22] Filed: Oct. 4, 1985
[51] Int. Cl.[4] ............................................. G09F 13/04
[52] U.S. Cl. ..................................... 362/97; 362/282
[58] Field of Search ................ 362/97, 223, 282, 284, 362/310, 307

[56] References Cited

U.S. PATENT DOCUMENTS

| 2,701,838 | 2/1955 | Loesch | 362/97 |
| 3,748,455 | 7/1973 | Welton | 362/97 |
| 3,802,102 | 4/1974 | Licciardi | 362/97 |
| 4,071,883 | 1/1978 | Dennis | 362/97 |
| 4,232,358 | 11/1980 | Nichols | 362/97 |
| 4,265,624 | 5/1981 | Krulwich | 362/97 |
| 4,335,421 | 6/1982 | Modia et al. | 362/97 |

Primary Examiner—E. Rollins Cross
Attorney, Agent, or Firm—John F. A. Earley; John F. A. Earley, III

[57] ABSTRACT

The invention discloses a combination comprising a storage case, a support stand, and one or more work surfaces. The storage case includes: a stand compartment in which to house the support stand and ancillary equipment as required, and a light compartment to provide a light source. The support stand includes legs, that can be folded for storage in the support case, and that can be telescoped for positioning a work surface at various heights and angles. The telescopic action may be electro-hydraulically operated. A choice of work surfaces enables the light compartment to be used as a light table or as a display screen for various types of image projection.

11 Claims, 7 Drawing Figures

DEMOUNTABLE MULTI-PURPOSE LIGHT TABLE

REFERENCES

The following prior art specifications are known to deal with light tables: U.S. Pat. No. 4,335,421 by Modia; U.S. Pat. No. 4,265,624 by Krulwich; and Australia application No. 32364/78 by Wignall.

BACKGROUND

1. Field of the Invention

The present invention relates to a light table carrying case combination that is portable, easy to store, and can be easily adapted for use in a variety of fields. In such adaptions, the table can be used as a display screen: for back projection of images, for sorting and sizing objects, for tracing drawings, for photographic work, and for general advertising and display.

2. Description of the Prior Art

The Modia specification discloses a light table carrying case combination; but the combination suffers from defects in that: the combination does not have legs, cannot be adjusted for height and angle, cannot house ancillary equipment, and cannot be put to various uses.

The Krulwich specification discloses a light table for back projection that can be angled as required; but the table suffers from defects in that: there are no legs, no height adjustment is possible, there is no carrying case, and the uses are limited.

The disclosure in the Wignall specification is similar to the disclosure in the Krulwich specification and suffers from similar defects.

SUMMARY OF THE INVENTION

The present invention overcomes the defects in the prior art inventions, and in its broadest aspect the present invention is a combination that includes: a storage case, one or more work surfaces able to be housed in the storage case, and a support stand; in which: the storage case includes a light compartment, having an opening extending on at least one side, and adapted to pass light through the opening; one of the work surfaces is a light transmitting work surface that extends across, or can be releasably attached to extend across, the light compartment opening; the support stand includes: a pair of end support means able to be put in a closed configuration for storage in the storage case and in an open configuration for support of the work surface, a stay means for maintaining the open configuration, and each support means includes at least one variable length telescopic leg so that the work surface can be put at an angle to the horizontal as required.

GENERAL DESCRIPTION OF THE INVENTION

Figure 2:
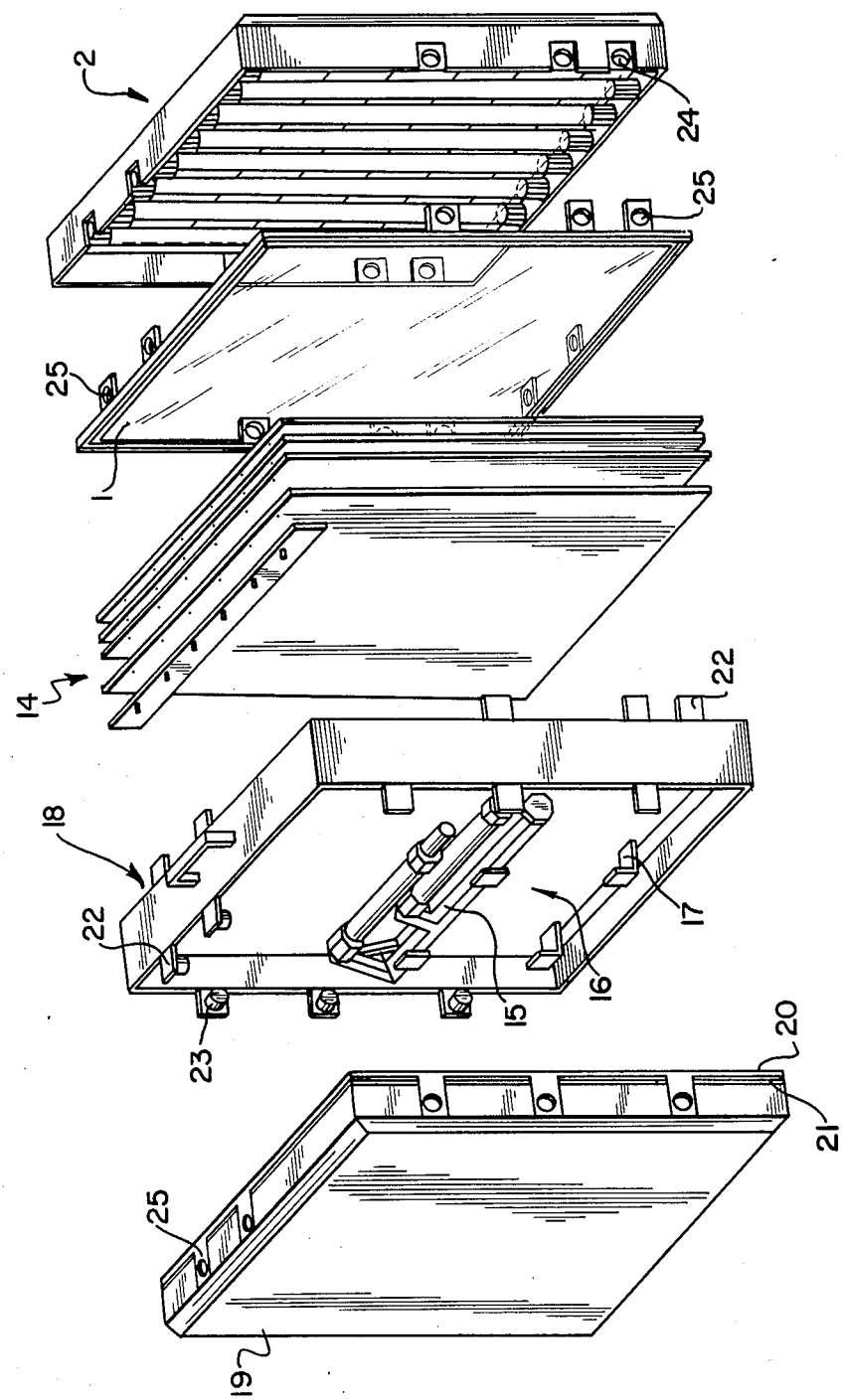
FIG. 2 is a perspective view of a storage case, in an open condition, having: a light compartment, a number of work surfaces, and an auxiliary compartment in which is stored a closed end support.

As can be seen in the figures, the light compartment is shaped so that, in conjunction with a work surface, it forms a table on which work can be performed and/or on which images can be projected. Generally, as seen in FIG. 2, the light compartment is a tray having edges, and a side on which a light source such as fluorescent tubes can be held for electric operation by appropriate sockets. A work surface may be permanently or releasably attached to extend across the front of the light compartment opening that is formed by the tray edges. The compartment side may be removable so that light from a source not contained within the compartment can be projected from a position at the back of the compartment to form images on a grey translucent work surface extending across the opening. The work surface may be one surface, or a composite surface formed by a grey translucent optical sheet extending across a clear transparent work surface. Generally for back projection the work surface will be at an angle to the horizontal.

When the invention is to have uses such as: tracing of drawings, sorting and sizing of objects, photographic, cutting, drafting; then work surfaces are chosen appropriate to the use. Generally for these uses the work surface will be horizontal.

The end support means is stored anywhere in the storage case that is convenient, but usually storage is in a stand compartment that can be used as a lid for the light compartment or the storage case as a whole. The stored stand can be held against movement during transport of the case by any suitable securing means.

When the end supports means are attached to one pair of opposite edges of the light compartment and/or a work surface, then there can be a spacer bar between and securing regions of the end support means remote from the attachment. It is possible to vary the geometry of the work surface by attachment to the other pair of opposite edges or by attaching two compartments edge to edge to achieve a common work surface; in these cases it is necessary for the spacer bar to have a variable length. The spacer bar may be filled with lead pellets or equivalent to achieve greater stability.

Figure 4:
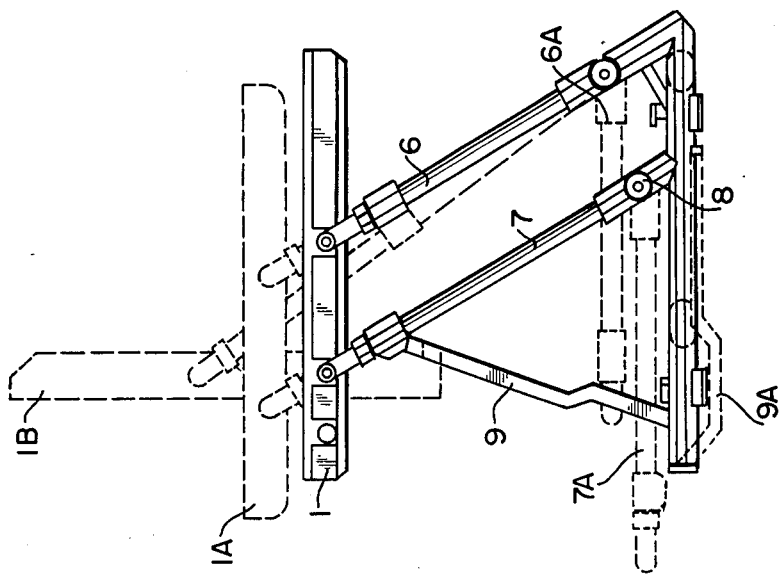
FIG. 4 is a side elevation of the light table of FIG. 1 showing: the end supports in open and closed configurations, and the work surface in two horizontal and one angled position.
Figures 5, 6:
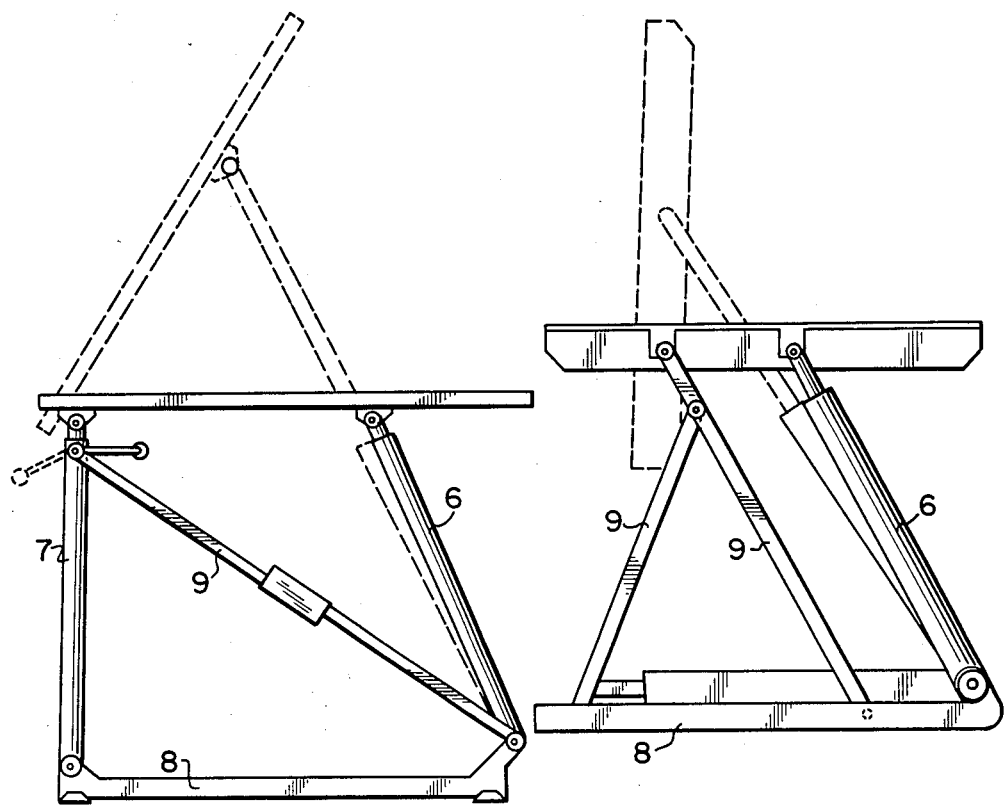
FIGS. 5 and 6 are side elevations of alternative embodiments of the invention shown in FIG. 4.

There can be various embodiments for the end support means and three such embodiments are shown in FIGS. 4, 5 and 6. In these embodiments, telescopic legs are hinged to a base member so that they can fold into the closed configuration as illustrated in dotted outline in FIGS. 4 and 6. In each embodiment the stay means is a stay bar hinged to the base member for also folding into the closed configuration. In FIG. 5 the stay bar has a hinge in its middle over which a sleeve can be slid to prevent folding.

The elements comprising the compartments, the work surfaces, and the end supports, can be attached one to the other by an attachment means that comprises different attachment devices appropriate for the element concerned. In a preferred embodiment however the attachment means comprises one attachment device for all elements.

As stated earlier, each end support means includes at least one telescopic leg, and FIG. 6 shows an embodiment having only one telescopic leg so that the angle of the work surface can be varied but not the height. FIGS. 4 and 5 show embodiments with two telescopic legs so that height variation can also be achieved.

The telescopic legs can comprise cylinders loosely fitting inside one and other, and the height and angle variations can be achieved by manually extending the legs to lengths as required, and then applying a mechanical stop to maintain the lengths. Such an embodiment is shown in FIG. 5 where the mechanical stop is operated by a stop lever as illustrated under the front of the work surface.

In another embodiment however the cylinders are fitted in a fluid tight manner so as to form a fluid tight chamber in the leg, and there is a fluid stop means whereby fluid can be prevented from leaving the leg chamber to thus maintain the leg at a required length. The fluid can be air, but in a preferred embodiment the fluid is a hydraulic fluid, and there is a pump means to cause the fluid to flow into and out of the leg chamber to produce required length changes. The pump means can be operated by hand or foot pumping, but where possible it is better that the pump means be electrically operated and foot controlled so that the hands remain free for working at the work surface. The pump means can be located anywhere on the end support means, but a convenient location is inside the spacer bar.

DETAILED DESCRIPTION OF THE INVENTION

Figure 1:
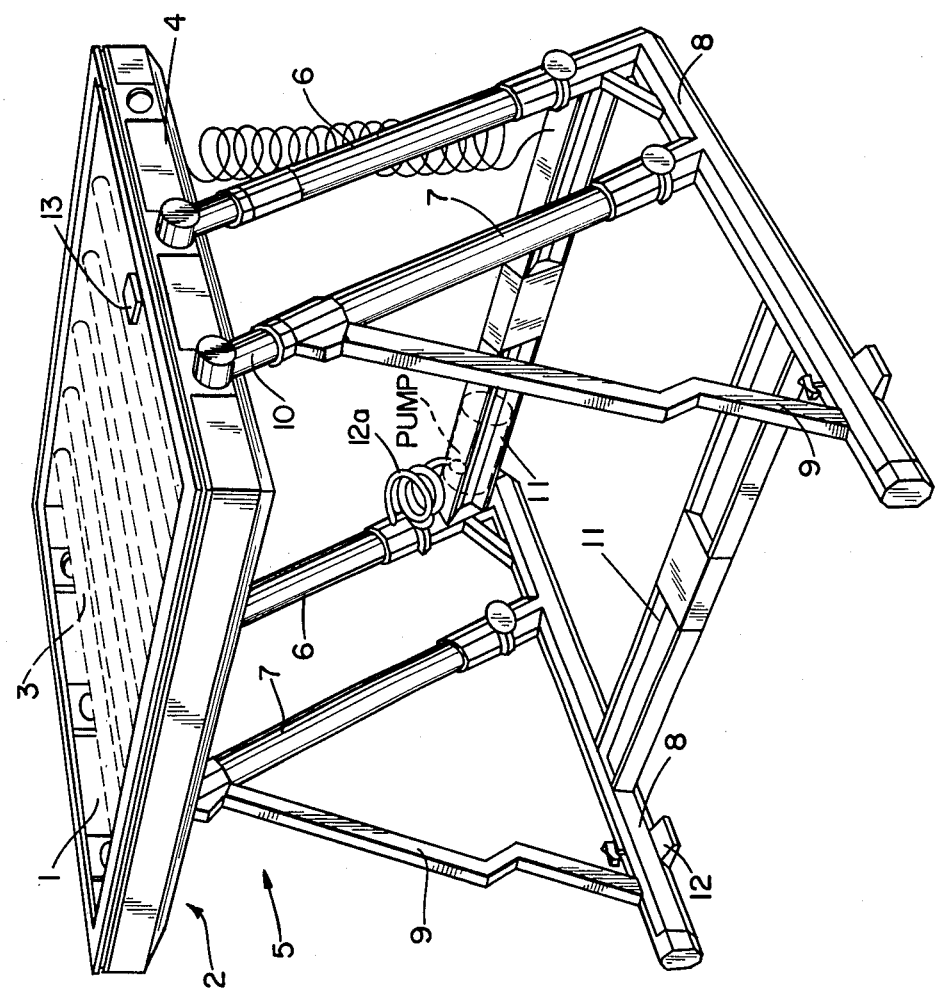
FIG. 1 is a perspective drawing of the light table supported in a horizontal position by the support stand in its open configuration.

In FIG. 1 is shown a light table with a transparent glass work surface 1 attached to a light compartment 2 that contains neon tubes 3. The light compartment has edges 4 to which are attached end supports 5 that comprise fluid tight hydraulically operated legs 6 and 7 that are hinged to base members 8. Also hinged at one end to the base members are stays 9 that are received at their other ends in stay holes 10 mounted on legs 7. Floor regions of the end supports are connected by a spacer bar 11, and there are floor level adjusters 12 positioned on the base members. A hydraulic pump (not shown) is positioned inside spacer bar 11 and a hydraulic line 12a leads to a hydraulic leg chamber (also not shown). Pump controls 13 are shown conveniently positioned on the work surface.

In FIG. 2 the work surface 1 is shown unattached from the light compartment 2, and four work surfaces that are optical sheets 14 are also shown unattached. A stand folded into a closed configuration is shown at 15 secured in a stand compartment 16 by securing brackets 17. Backing on stand compartment is a first auxiliary compartment 18 in which may be stored the optical sheets and other ancillary equipment such as the spacer bar. A second auxiliary compartment is shown at 19 having another optical work surface 20 and additional optical sheets 21 forming a closure to its opening. The second auxiliary compartment can be a second light compartment or a general storage compartment. Extending from the stand compartment and the first auxiliary compartment are flexable attachment lugs 22 having upstanding studs 23 that are able to be received into matching attachment stud holes 24 positioned in edges of the light compartment. Also extending from work surfaces 1 and 20 are similar attachment lugs 25 having holes through which the studs 23 pass before being received in the stud holes 24.

Figure 3:
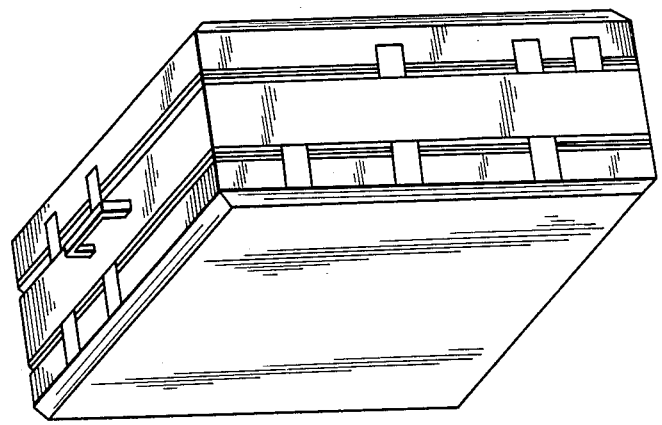
FIG. 3 is a perspective view of the invention show in FIG. 2 with the storage case assembled for carrying.

FIG. 3 shows all the elements in FIG. 2 assembled together to form a storage case having a carrying handle as illustrated.

In FIG. 4 the legs and stay bar are shown in open configuration at 6,7 and 9 and folded in closed configuration at 6A, 7A, and 9A. The work surface is shown: in one horizontal as 1, in another horizontal position as 1A, and in an angled position as 1B. It is seen that these positions are achieved by length variations in the legs.

Figure 7:
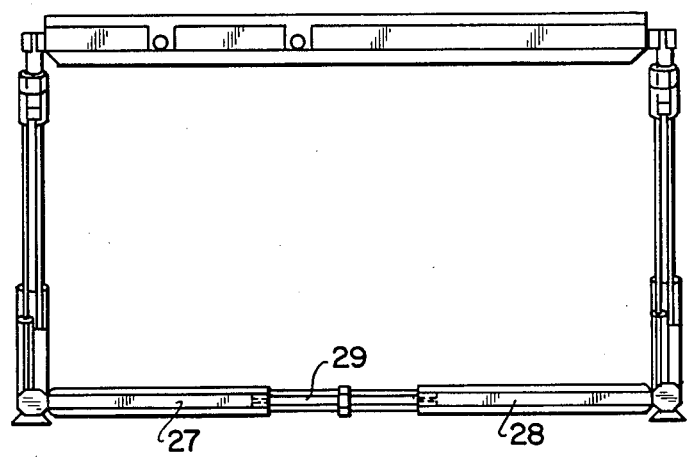
FIG. 7 is a front elevation of the light table showing a variable length spacer bar.

FIG. 7 shows the light table in front elevation with the end supports attached by a telescopic spacer bar comprising two sections 27 and 28 telescopically joined by a central section 29. As with FIGS. 4, 5 and 6 the hydraulic line 12a and pump controls 13 are not illustrated. There is a length lock on the spacer bar to maintain a required length. When a different work surface geometry is required, such as rotating the work surface through ninety degrees, then the spacer bar length is accordingly changed.

The invention has been generally described in respect to various embodiments, but it must be appreciated that variations may be made by a man skilled in the art as circumstances dictate.

What is claimed is:

1. A storage case light table combination that includes a storage case, one or more work surfaces able to be housed in the storage case, and a support stand in which the storage case includes a light compartment, having an opening extending on at least one side, and adapted to pass light through the opening, one of the work surfaces is a light transmitting work surface that extends across, or can be releasably attached to extend across, the light compartment opening, and the support stand includes a pair of end support means able to be put in a closed configuration for storage in the storage case and in an open configuration for support of the work surface, and a stay means for maintaining the open configuration, each support means including at least one variable length telescopic leg so that the work surface can be put at an angle to the horizontal as required.

2. A combination as defined in claim 1 in which there are a plurality of work surfaces and there is a surface attachment means whereby work surfaces as required may be releasably attached across the light compartment opening.

3. A combination as defined in claim 1 in which the light transmitting surface is clear and others of the work surfaces are optical sheets that modify the transmitting properties of the clear surface as required.

4. A combination as defined in claim 1 in which there is a socket means to operatively hold a light source positioned in the light compartment to direct light from the source through the light compartment opening.

5. A combination as defined in claim 1 in which the storage case includes a stand compartment having a means for securing therein the end support means in a closed configuration.

6. A combination as defined in claim 1 in which there is an attachment means whereby the light compartment may be attached: to the end support means in open configuration, to at least one work surface, and to the stand compartment when present to form a closed storage case.

7. A combination as defined in claim 1 in which each end support means includes two telescopic legs so that the work surface can also be put at various heights as required.

8. A combination as defined in claim 1 in which at least one telescopic leg in each end support means includes an inner cylinder moveably positioned in an outer cylinder to form a fluid tight leg chamber therebetween, and there is a fluid stop means whereby fluid access to the leg chambers may be controlled.

9. A combination as defined in claim 8 in which the fluid is a hydraulic fluid and there is a pump means whereby the amount of fluid in the fluid chambers can be controlled to vary the length of the hydraulic legs.

10. A combination as defined in claim 1 in which there is a spacer bar for removable attachment between the end support means.

11. A storage case light table combination that includes a storage case, one or more work surfaces able to be housed in the storage case, and a support stand in which the storage case includes a light compartment, having an opening extending on at least one side, and adapted to pass light through the opening, one of the work surfaces is a light transmitting work surface that extends across, or can be releasably attached to extend across, the light compartment opening, and the support stand includes a pair of end support means able to be put in a closed configuration for storage in the storage case and in an open configuration for support of the work surface, and a stay means for maintaining the open configuration, each support means including at least one variable length telescopic leg so that the work surface can be put at an angle to the horizontal as required, wherein there are a plurality of work surfaces and there is a surface attachment means whereby work surfaces as required may be releasably attached across the light compartment opening, wherein the light transmitting surface is clear and others of the work surfaces are optical sheets that modify the transmitting properties of the clear surface as required, wherein there is a socket means to operatively hold a light source positioned in the light compartment to direct light from the source through the light compartment opening, wherein the storage case includes a stand compartment having a means for securing therein the end support means in a closed configuration, wherein there is an attachment means whereby the light compartment may be attached: to the end support means in open configuration, to at least one work surface, and to the stand compartment when present to form a closed storage case, wherein each end support means includes two telescopic legs so that the work surface can also be put at various heights as required, wherein at least one telescopic leg in each end support means includes an inner cylinder moveably positioned in an outer cylinder to form a fluid tight leg chamber therebetween, and there is a fluid stop means whereby fluid access to the leg chambers may be controlled, wherein the fluid is a hydraulic fluid and there is a pump means whereby the amount of fluid in the fluid chambers can be controlled to vary the length of the hydraulic legs, and wherein there is a spacer bar for removable attachment between the end support means.

* * * * *